United States Patent [19]

Lauly

[11] Patent Number: 4,925,693

[45] Date of Patent: May 15, 1990

[54] PRODUCTION OF A FOOD POWDER AND OF FOOD PRODUCTS CONTAINING THE POWDER

[76] Inventor: Alain Lauly, 22 boulevard Dardenne, 31110 Luchon, France

[21] Appl. No.: 217,626

[22] Filed: Jul. 11, 1988

[51] Int. Cl.$^5$ .............................................. A21D 2/08
[52] U.S. Cl. ..................................... 426/549; 426/63; 426/556; 426/615
[58] Field of Search .................. 426/615, 549, 556, 63

[56] References Cited

U.S. PATENT DOCUMENTS 4,431,677  2/1984  Altomare et al. .................... 426/615
4,431,681  2/1984  Hegedus et al. ..................... 426/553

Primary Examiner—Donald E. Czaja
Assistant Examiner—Mary S. Mims
Attorney, Agent, or Firm—Horst M. Kasper

[57] ABSTRACT

The present invention concerns a process for obtaining a food powder, the food powder thus obtained, and food products made by using as a starting material the food powder and other ingredients. The process comprises the peeling of the pineapple stems, drying them, and crushing them in order to obtain a powder of a certain grain size.

22 Claims, 1 Drawing Sheet

PRODUCTION OF A FOOD POWDER AND OF FOOD PRODUCTS CONTAINING THE POWDER

BACKGROUND OF THE INVENTION

1. Field of the Invention

The present invention relates to a process for preparing a food powder, to the powder obtained by this process, and to food products prepared with the said powder as a starting material as well as with other ingredients.

The food powder obtained according to the present invention contains a small fraction of easily digestible sugar such as glucose, fructose, or sucrose, an important portion of the complex sugar such as starch, and an important fraction of plant fibers, such as the cellulose and the hemi-cellulose.

This powder is therefore important for the incorporation in the preparation of food products which have a low content of immediately available calories and a large content in plant fibers necessary to diminish the intestinal transit.

2. Brief Description of the Background of the Invention Including Prior Art

The pineapple is a low-growing perennial plant and belongs to the species of ananas comosus of the plant order Bromeliales, which is indigenous to the Americas. The root stock produces a compact cluster of stiff swordlike leaves from the center of which arises a spike of crowded flowers, crowned by a cluster of smaller spiney leaves. Each flower produces a berry. All the berries of the cluster and adjacent flower parts fuse to form a compound juicy fruit resembling a pine cone, hence the name. Pineapple plants can grow to a height of one meter and thrive in dry sandy soil. Hitherto, the juicy fruit has been substantially exploited for fruit and juice production.

Presently, the food products with a low calory content and with a high plant fiber content are in demand for well-known reasons which are set forth in the U.S. Pat. No. 4,431,677. This patent describes a food powder which is fabricated from a base of pineapple hearts. The hearts of the pineapple are cut into slices and washed with water in order to dissolve the water-soluble carbohydrates, such as sucrose, fructose, and glucose, and then treated with alcohol in order to eliminate certain tastes and smells.

The drawbacks of this method include: (1) low content in complex sugar, since a large part of the sugar in the fruit exists in a water-soluble form; (2) washing out of water-soluble mineral salts; (3) low content in bromelain. This enzyme exists to the largest part in the stem. It is noted that the bromelain which exists in the stems of the pineapple is different from the one existing in the fruits. The bromelain of pineapple stems has a more important proteolytic activity than the bromelain of the pineapple fruits as will be described in detail below; (4) increased fabrication cost: there are several washings with water, treatment with alcohol, and high humidity in the raw material which results in a relatively small amount of dry powder.

It is also to be noted that the production of such a powder based on a sub-product, i.e. pineapple hearts, depends completely on the essential product, i.e. pineapple fruit, which prevents to form the fabrication of this powder in an independent manner, in particular as far as the quantity production is concerned.

This latter reason invites to look for a raw material source which is available in larger quantities.

SUMMARY OF THE INVENTION

1. Purposes of the Invention

It is an object of the present invention to provide a process for obtaining a food powder which can be used as an additive to certain food products.

It is yet another object of the present invention to employ the stems of the pineapple plant in food production.

It is a further object of the present invention to produce food additives suitable for controlling and regulating transit times in the digestive tracts.

A further object of the invention are food products which are prepared with said powder as a starting material and with other ingredients.

It is further noted that this powder can also be used in a pure state, i.e. in capsules for example. This powder, as already stated, is rich in plant fibers, in starch, and in bromelain, and it is poor in easily digestible sugars.

These and other objects and advantages of the present invention will become evident from the description which follows.

2. Brief Description of the Invention

A process for producing a food powder for use in the preparation of certain food products by mixing it with other food ingredients for obtaining products ready for a user comprises the following steps. The pineapple stems are stripped and peeled. The stripped and peeled stems are dried and the dried stems are comminuted for obtaining a powder of a predetermined grain size.

The comminuted dried stems can be sifted for controlling a food ingredient powder of a defined grain size. The drying can be carried out at relatively low temperature of from about 40 to 60 degrees centigrade. The drying can be performed at a pressure of less than about one half atmosphere.

The processing steps can furthermore comprise the steps of cutting the stripped stems and of drying the stripped and cut stems at a temperature not exceeding 50 degrees centigrade. The cut stems can be dried at a pressure of from about 0.01 to 0.2 bars.

The pineapple stem powder can be mixed with flour and the mixture can be baked at a temperature from about 80 to 220 degrees centigrade.

A rising agent can be added to the mixture of pineapple-stem powder and flour. The pineapple-stem powder can be mixed with flour and with an edible liquid. The mixture can be formed into desired shapes. The mixture can be boiled at a temperature from about 90 to 120 degrees centigrade in an aqueous solution or fried at a temperature from about 90 to 180 degrees centigrade in a fatty liquid.

A food powder according to the invention comprises pineapple-stem powder of a predetermined grain size containing grains resulting from stripped, peeled, dried and comminuted pineapple stems. The food powder can also comprise a member selected of the group consisting of cacao powder, milk, fruit, and vegetable. The food powder according to the invention can also be contained in bakery flour such as is used for example for bakery products or for products of the Viennese bakery. The baked flour compositions can contain, surround and support grains of the pineapple stem powder.

In accordance with the present invention, there is obtained a food powder which has the following properties. It includes a considerable portion of starch materials, it includes a considerable portion of vegetable fibers, and it includes an enzyme with a digestive effect on proteins, the bromelain. Bromelain is a proteolytic enzyme found in pineapples with properties similar to those of papain.

The bromelain extract of the pineapple stem is different from that extracted from the fruits, in particular in view of the chemical formula and further in view of the enzymatic activity.

The chemical formula of the bromelain of pineapple stems is presented in FIG. 1. It is formed by a hydrocarbon chain which is attached by a covalent bond to a peptide chain.

The hydrocarbon chain contains 1 molecular of fucose, 1 of xylose, 3 of mannose, and 2 of N-acetyl-glucosamine, while that of the bromelain of the pineapple fruit does not contain glucosamine. This influences the enzymatic activity of each one of the two enzymes.

Table 1 below illustrates the comparative result of a study which was made relative to the two bromelains. The measure unity of the enzymatic activity is the proteolitic unity (UP). The definition of this activity can be found in "SUBRAMANIAN N, CARTAXO MAQ, SUBRAMANIAN S, DE FARIAS JL Study of Bromelain Present in the Pineapple plant of Paraibq."

TABLE 1

| Section of plant | Bromelain in g/kg of plant | Activity/kg of plant (UP) | Activity/g bromelain (UP) |
| --- | --- | --- | --- |
| STEM | | | |
| Lower part of stem | 2.45 | 1,386,000 | 565,714 |
| Upper part of stem | 1.62 | 1,309,000 | 808,025 |
| RIPE FRUIT | | | |
| Peel | 1.78 | 278,300 | 156,348 |
| Pulp | 1.29 | 336,900 | 261,162 |

It is to be noted that the stems in general contain a higher concentration of bromelain than the ripe fruits. Furthermore, the bromelain which is contained in the stems has an enzymatic activity, which is per weight unit higher than that of the bromelain contained in the fruits.

The stability of the bromelain under the usual storage conditions is very good. It can easily support a storing of more than 18 months at a temperature of 37° C. On the other hand, a subjection of the bromelain to a temperature of 80° C. during 30 seconds leads to denaturization.

Nevertheless, analyses carried out by the applicant on the enzymatic activity of the active bromelain in the bread prepared according to the recipe, which is given below, have shown an activity of 8 units Anson/kilogram of bread.

The existence of this enzyme in a finished food product, in which said powder is incorporated during the production, is conditional on the temperature to which this enzyme is exposed during said production. In fact, if the said enzyme is introduced during the production with the powder in a food product, which is exposed to an elevated temperature during its production, the enzyme will not remain active and intact. In this case, the food product does not contain this enzyme.

As is known, plant fibers shorten the intestinal transit time and can be useful in case of constipation by obstruction or in case of atonic constipation, caused by low physical condition.

It is further known that a regular intake of carbohydrates, or glucides, having an elevated molecular weight, for example starch, helps to control the blood-sugar level, or glycemia, in case of a diabetic person.

It is another object of the invention to produce such a powder at the lowest cost possible.

According to a feature of the present invention, the process according to the invention consists essentially of stripping and scalding the stems of the pineapple, of drying them, and of crushing them, and pulverizing them in order to obtain a powder of a predetermined grain size.

The customary drying can be carried out at a low temperature in order to avoid destruction of the existing enzyme. It can also be carried out at a reduced pressure as compared to ambient pressure.

According to another feature, the food powder according to the invention is characterized in that it is prepared according to the process part of the present invention.

The novel features which are considered as characteristic for the invention are set forth in the appended claims. The invention itself, however, both as to its production and its method of process, together with additional objects and advantages thereof, will be best understood from the following description of specific embodiments when read in connection with the accompanying analytical results and drawing.

DESCRIPTION OF INVENTION AND PREFERRED EMBODIMENT

Figure 1:
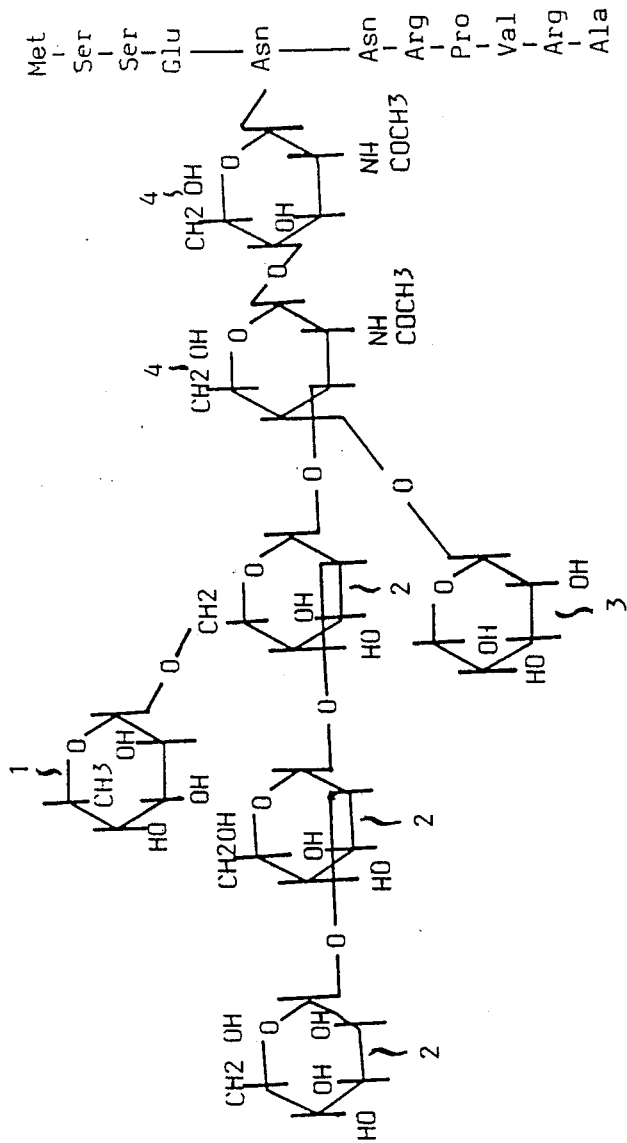
FIG. 1 illustrates the chemical formula of the bromelain of pineapple stems.

According to the present invention, there is provided a process for producing a food powder for use in the preparation of certain food products by mixing it with other products ready for a user. The process comprises the steps of stripping and peeling of pineapple stems, and of drying and grinding of crushing of said stems for obtaining a powder of a predetermined grain size.

A sifting can be carried out after the crushing in order to control the grain size of the power produced.

The drying can be carried out at low temperature and preferably at a temperature not exceeding 70 degrees centigrade. The drying can be is carried out at a low pressure.

The process can consist in stripping the pineapple stems, cutting the stripped stems, drying the stripped and cut stems at a temperature not exceeding 50 degrees centigrade and at a low pressure, crushing the resulting dried product, and sifting the crushed material.

The process according to the present invention solely calls for pineapple stems as base material for the production of the food powder. These stems, resulting from the pineapple culture as a by-product, are stripped, dried, then crushed and finally sifted and passed through a sieve for obtaining the powder of a predetermined grain size. The crushing and the sifting determine the grain size of the powder to be obtained. This grain size has to be determined depending on the intended further use of the powder. If the powder is intended to be introduced into the production of a food product to be used to reduce the intestinal duct transit times, then the plant fiber length has to be large enough to favor this reduction in the transit times. This means that the granules, resulting from the crushing and from the sifting, are to have a considerable size.

Experience has shown that the granules passed through a sieve where the mesh is between about 100 and 900 micrometers are suitable for this kind of application. If the large size of these granules is undesirable for the consistency of certain food products into which the said powder is introduced, one uses the powder the grains of which are of a small size. The powder of the pineapple stem, sifted with the aid of a sieve where the mesh has a size from between 20 and 100 micrometers, can for example be incorporated in chocolate during its production without the existence of the said powder being easily discerned when tasting of the said chocolate. The same holds true for yoghurt, for preserves and jam, for cheese, for sherbet, and for ice cream.

The drying is to be carried out at a temperature to be determined according to whether one wants to retain or not retain the said enzyme in the produced powder. In the case where one wishes to retain this enzyme intact, the drying has to be carried out at a temperature not exceeding about 70° C.

In order to accelerate the drying process while keeping the temperature low, this can be carried out under a reduced pressure versus ambient pressure.

The powder of the pineapple stems produced according to the above described process gives the following analytical results:

|   |   | (% = Percent by weight) |
|---|---|---|
| Water content | | 7.1% |
| Mineral elements: | phosphorus P | 0.097% |
| | potassium K | 1.680% |
| | calcium Ca | 0.288% |
| | magnesium Mg | 0.103% |
| | chlorine Cl | 0.553% |
| | sulphur S | 0.52% |
| | sodium Na | 0.008% |
| | iron Fe | 224 ppm |
| | zinc Zn | 7 ppm |
| | copper Cu | 3 ppm |
| | manganese Mn | 63 ppm |
| Protides | | 4.47% |
| Lipides | | 2.67% |
| (according to an extraction during four hours in hexane, in a Soxhlet apparatus) | | |
| Sugar: | glucose | 2.26% |
| | fructose | 1.51% |
| | sucrose | 2.21% |
| Starch | | 41.5% |

| Fibers (according to the method of Van Sost) | | | |
|---|---|---|---|
| | cellulose | hemicellulose | lignine | residual organic matter |
| untreated | 9.4 | 20.9 | 2.1 | 1.3 |
| fat removed | 9.5 | 21.2 | 2.3 | 1.0 |

The pH at 10 percent by weight concentration in distilled water is 5.

The enzymatic activity for a drying at a maximum of 50° C. on a substrate of casein at pH 7 at 35° C. after activation by cysteine equals 1000 units anson for one gram.

The powder of the pineapple stem such as it is produced according to the process forming part of the present invention, can either be introduced in the production of certain food products, for example chocolate, yoghurt, jams and preserves, cheese, sherbet, ice cream, bread and any products such as bakery or viennese-bread products, or dehydrated soup products, or be added to other food products ready for consumption, for example spaghetti, and this with parmesan cheese.

In the case of chocolate, the said powder is added and mixed thoroughly under cool conditions, a maximum of 50° C., during the production. Its grain size is preferably about 60 micrometers. Its drying has to be carried out at less than 50° C. The chocolate thus produced contains bromelain.

In the case of bread or similar products, the enzyme contained in the added powder is, to a large extent, decomposed under the effect of the baking heat. The added powder must have a considerable grain size. A powder, sifted with a sieve having of mesh size of approximately 600 micrometers, is suitable to be introduced into the panification process and the turning into bread. The bread thus produced contains itself indigestible plant fibers that help to reduce the transit times of this bread in the intestine.

A bread according to the present invention can be prepared according to the following recipe:

COMPOSITION

| Flour type 55 | 5 kg |
|---|---|
| Yeast | 100 g |
| Fermented dough | 750 g |
| Water | 2,630 g |
| Salt | 110 g |
| Powder of pineapple stems 500 microns | 100 g |

PREPARATION METHOD

The dough is kneaded with a beater at low speed for 10 minutes, which has to be maintained;

The dough is left to rest in the tank for about 20 minutes, where the temperature of the dough is from about 24° to 26° C.;

The powder is incorporated and mixed for 2 to 3 minutes, care has to be taken since the mixture liquefies rapidly;

Separate quickly into sections, form balls, and let the dough lumps rest for 5 minutes;

Cover dough lumps and let rise for 40 minutes;

Place in an oven heated not too high, at a temperature of about 240° C.;

Let bake for 30 minutes.

It is to be noted that by the incorporation of the pineapple stem powder into different baked goods, it was observed that this power could help to make these baked goods better digestible based on its content of bromelain and of plant fibers.

The food powder forming part of this invention can be added to food products ready for consumption. The powder of pineapple stems dried at a low temperature, i.e. the powder containing the bromelain, can added to certain dishes ready for consumption. This helps to facilitate the digestion of the proteins contained in said dishes at least during the chewing or masticating and before the enzyme itself is digested in the stomach. The non-digestible fibers of the powder of pineapple stems aids the passage of foodstuffs through the intestines. These fibers do not undergo a fermentation in the intestines and do therefore not provoke a release of gas in the intestines.

It is to be noted that the contribution of the starch carried by said powder helps to control and regularize the glycemia, or blood-sugar, level, in particular with persons suffering from diabetes. It is well understood that other food applications of the said powder can be found based on the above-described details.

The process and the products according to the invention can receive any known modifications and any ordinary technical improvements without being outside of the range of the present invention.

It will be understood that each of the elements described above, or two or more together, may also find a useful application in other stem processing methods and food powder production systems differing from the types described above.

While the invention has been illustrated and described as embodied in the context of a process for the production of a food powder based on pineapple stems, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A process for producing a food powder for use in the preparation of certain food products by mixing it with other food ingredients for obtaining products ready for a user, comprising
   stripping and peeling of pineapple stems;
   drying said stripped and peeled stems;
   comminuting said dried stems for obtaining a powder of a predetermined grain size.

2. The process according to claim 1 further comprising
   sifting the comminuted dried stems for controlling a food ingredient powder of a defined grain size.

3. The process according to claim 1, wherein the drying is carried out at relatively low temperature of from about 40 to 60 degrees centigrade.

4. The process according to claim 1, wherein the drying is performed at a pressure of less than about one half atmosphere.

5. The process according to claim 1 further comprising the steps of
   cutting the stripped stems; drying the stripped and cut stems at a temperature not exceeding 50 degrees centigrade.

6. The process according to claim 5 further comprising
   drying the cut stems at a pressure of from about 0.01 to 0.2 bars.

7. The process according to claim 1 further comprising
   mixing the pineapple stem powder with flour;
   baking the mixture at a temperature from about 80 to 220 degrees centigrade.

8. The process according to claim 7 further comprising
   adding a rising agent to the mixture of pineapple-stem powder and flour.

9. The process according to claim 1 further comprising
   mixing the pineapple-stem powder with flour and with an edible liquid;
   forming the mixture into desired shapes;
   boiling the mixture at a temperature from about 90 to 120 degrees centigrade in an aqueous solution.

10. The process according to claim 1 further comprising
    mixing the pineapple-stem powder with flour and with an edible liquid;
    forming the mixture into desired shapes;
    frying the mixture at a temperature from about 90 to 180 degrees centigrade in a fatty liquid.

11. Process for producing a food powder for use in the preparation of certain food products by mixing it with other products ready for a user, comprising
    stripping and peeling of pineapple stems;
    drying and grinding or crushing of said stems for obtaining a powder of a predetermined grain size.

12. Process according to claim 11, wherein a sifting is carried out after the crushing in order to control the grain size of the power produced.

13. Process according to claim 11, wherein the drying is carried out at low temperature and preferably at a temperature not exceeding 70 degrees centigrade.

14. Process according to claim 11, wherein the drying is carried out at a low pressure.

15. Process according to claim 11 which consists in stripping the pineapple stems, cutting the stripped stems, drying the stripped and cut stems at a temperature not exceeding 50 degrees centigrade, crushing the resulting dried product, and sifting the crushing material.

16. Process according to claim 11 comprising stripping the pineapple stems, cutting them, drying them at a temperature not exceeding 50 degrees centigrade and at a low pressure, crushing them, and sifting them.

17. A food powder comprising
    pineapple-stem powder of a predetermined grain size containing grains resulting from stripped, peeled, dried and comminuted pineapple stems.

18. The food powder according to claim 17 further comprising a member selected of the group consisting of cacao powder, milk, fruit, and vegetable.

19. The food powder according to claim 18 further comprising bakery flour such as is used for bakery products or for products of the Viennese bakery and wherein the food powder is produced according to the process of claim 1.

20. The food powder according to claim 18 further comprising baked flour compositions containing grains of the pineapple stem powder.

21. The process according to claim 1 further comprising
    sifting the comminuted dried stems for controlling a food ingredient powder of a defined grain size;
    wherein the drying is performed at a pressure of less than about one half atmosphere;
    and further comprising the steps of cutting the stripped stems; drying the stripped and cut stems at a temperature not exceeding 50 degrees centigrade;
    mixing the pineapple stem powder with flour;
    baking the mixture at a temperature from about 80 to 220 degrees centigrade; and
    adding a rising agent to the mixture of pineapple-stem powder and flour.

22. The process according to claim 1, wherein the drying is carried out at relatively low temperature of from about 40 to 60 degrees centigrade, and further comprising the following steps
    drying the cut stems at a pressure of from about 0.01 to 0.2 bars;
    mixing the pineapplle-stem powder with flour and with an edible liquid;
    forming the mixture into desired shapes;
    frying the mixture at a temperature from about 90 to 180 degrees centigrade in a fatty liquid.

* * * * *